United States Patent [19]
Currier et al.

[11] 3,716,066
[45] Feb. 13, 1973

[54] AIRCRAFT CLEANING

[75] Inventors: John W. Currier; Richard T. Gadbois; Arthur G. Wilde, all of St. Paul, Minn.

[73] Assignee: Minnesota Mining and Manufacturing Company, St. Paul, Minn.

[22] Filed: June 2, 1970

[21] Appl. No.: 42,833

[52] U.S. Cl. .................. 134/7, 15/3, 239/142, 239/379, 239/599
[51] Int. Cl. ........................................ B08b 7/00
[58] Field of Search .......... 15/3; 239/142, 336; 134/7

[56] References Cited

UNITED STATES PATENTS

| 1,879,101 | 9/1932 | Coleman | 239/336 X |
| 3,203,631 | 8/1965 | Jutila | 239/142 X |
| 3,512,713 | 5/1970 | Carlyon, Jr. | 239/142 X |
| 1,907,411 | 5/1933 | Timoney | 15/3 |

Primary Examiner—Lloyd L. King
Assistant Examiner—Reinhold W. Thieme
Attorney—Kinney, Alexander, Sell, Steldt & Delahunt

[57] ABSTRACT

Apparatus and method for cleaning the exterior surface of aircraft using a cleaning solution and small, light, resilient, liquid-absorbent bodies that are insoluble in the cleaning solution which are mixed in a chamber in a controlled volume ratio to produce a uniform suspension. The uniform suspension is moved from the mixing chamber and is impelled from a nozzle at a controlled velocity to impact against and clean the exterior surface of the aircraft spaced from the nozzle.

5 Claims, 3 Drawing Figures

PATENTED FEB 13 1973

3,716,066

INVENTORS
JOHN W. CURRIER
RICHARD T. GADBOIS
ARTHUR G. WILDE
BY Kinney Alexander,
Sell, Steldt & DeLaHunt
ATTORNEYS

AIRCRAFT CLEANING

The present invention relates to an apparatus and method for cleaning the exterior surface of aircraft with a uniform suspension of a cleaning solution and resilient liquid-absorbent bodies by impelling the suspension against the exterior aircraft surface.

The cleaning of the exterior surface of aircraft presently involves a large expenditure of time and money by the commercial airline companies. Commercial aircraft are cleaned on the average of once every 10 days to reduce air drag and unnecessary weight and to improve the appearance of the aircraft. Presently the exterior surface of an airplane is cleaned by spraying a cleaning solution over the surface, manually mopping the cleaning solution to loosen the soil and rinsing the surface. While the cost of labor and materials is itself large, approximately 90 percent of the total cost results from revenue lost due to the downtime necessary to manually clean the exterior surface of the aircraft. Furthermore, commercial aircraft are increasing in size and the revenue loss caused by the downtime necessary to manually clean the exterior surface of these aircraft is rapidly increasing. For this reason a semi-automated or automated system for cleaning at an increased rate to decrease the downtime is needed.

Attempts have been made to automate aircraft cleaning by utilizing the equipment commercially available for washing the exterior surfaces of automobiles. However, such attempts have been unsuccessful since the pressure with which the cleaning solution is impacted against automobiles with this equipment is sufficient to damage the surface of aircraft. Upon reducing the impact pressure aircraft surfaces have not been effectively cleaned. These unsuccessful attempts to utilize automobile washing technology in cleaning the exterior surface of aircraft have included impelling mixtures of cleaning solution and particulate material as disclosed in U.S. Pat. Nos. 1,907,411 and 2,660,744.

According to the present invention there is provided an apparatus and a method for effectively cleaning the exterior surface of aircraft utilizing extremely low pressures and without any deleterious effect to the aircraft. The apparatus comprises a mixing chamber, means for supplying a cleaning solution to the mixing chamber, means for supplying small, light, resilient, liquid-absorbent bodies that are insoluble in the cleaning solution to the mixing chamber, means for controlling the amounts of cleaning solution and resilient bodies supplied to provide a dry mass density volume ratio of cleaning solution to resilient bodies of from about 3 to 1 to about 1 to 1. The apparatus has a mixer for mixing the cleaning solution and resilient bodies to provide a uniform suspension of the resilient bodies in the solution, and the suspension is discharged out of the mixing chamber and is impelled from a nozzle directed toward and spaced from the exterior surface of an aircraft a distance between about one foot and about twenty feet with a controlled velocity to strike the exterior surface of the aircraft with an impact pressure of from about 0.05 p.s.i. to about 40.0 p.s.i. The method comprises the steps of supplying a cleaning solution to a mixing chamber, supplying small, light, resilient, liquid absorbent bodies to the mixing chamber, controlling the supplying steps to provide a volume ratio of cleaning solution to resilient bodies of from about 3 to 1 to about 1 to 1, mixing the cleaning solution and the resilient bodies to provide a uniform suspension of the resilient bodies in the solution, and moving the suspension from the mixing chamber and impelling it by a progressing cavity pump from a nozzle directed toward and spaced from the exterior surface of an aircraft a distance between about 1 foot and about 20 feet with a controlled velocity to strike the exterior surface of the aircraft with an impact pressure of from about 0.05 p.s.i. to about 40.0 p.s.i.

The novel features and advantages of the present invention will become more apparent upon reading the following description which refers to the accompanying drawings wherein.

Figure 1:
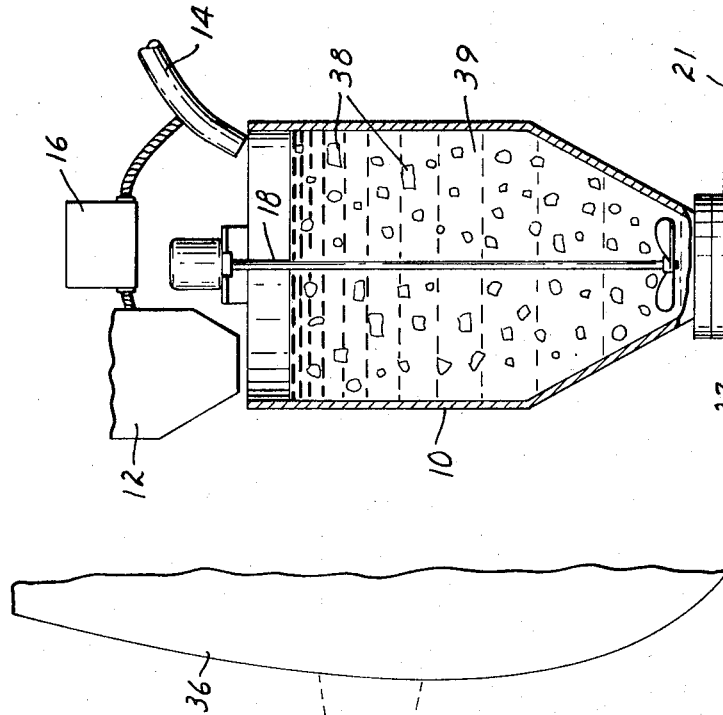
FIG. 1 is an elevational view illustrating an apparatus constructed according to the present invention practicing the method of the present invention.

Referring now to the drawings there is illustrated an apparatus made in accordance with the present invention for use in cleaning the exterior surface of aircraft. The apparatus comprises a mixing chamber 10, means affording a resilient body supply 12, means affording a cleaning solution supply 14, a supply control 16, a mixing assembly 18, a progressing cavity pump 20, a discharge hose 22 and a nozzle 24.

The mixing chamber 10 has the shape of a cylinder set upon a truncated cone and is normally supported with its axis vertical. The larger diameter top opening in the cylindrical portion of the mixing chamber 10 provides an inlet to the chamber and the smaller diameter opening in the truncated conical portion thereof provides an outlet from the chamber. Around the periphery of the outlet the mixing chamber 10 is formed with a flange for securing the mixing chamber to an upstanding connecting pipe 26. The connecting pipe 26 is formed with flanges at both ends and it contains a conventional sliding disk valve 27 which may be used to stop or regulate the flow from the mixing chamber 10. The second flange of the connecting pipe 26 mates with and is secured to a similar flange at the inlet to the pump 20.

The resilient body supply 12 may be of any suitable construction to permit regulated flow of small resilient bodies or sponges into the mixing chamber 10. The discharge opening from the resilient body supply 12 is arranged above the inlet to the mixing chamber 10 to facilitate feeding of the sponges as by gravity. The cleaning solution supply 14 may be a pipe having its discharge located at the inlet to the mixing chamber 10 and having a suitable flow regulating valve. The supply control 16 is provided to meter the flow from both the resilient body supply 12 and the cleaning solution supply 14. The supply control 16 may include valves in the resilient body and cleaner solution supplies which are opened simultaneously to predetermined extents by a signal generated when the operator presses a switch and it may further include a feed back loop in which the discharges from the resilient body and cleaning solution supplies 12 and 14 are measured and the flow from each is adjusted according to a predetermined volume ratio.

The mixing assembly 18 comprises a motor supported above the mixing chamber 10 having an elongated drive shaft extending axially of the mixing chamber 10 to a point adjacent the mixing chamber outlet where it supports a mixing blade. The mixing blade is formed to move the solution 39 and the resilient bodies 38 vertically downward centrally of the chamber 10 and upward along the interior walls of the chamber upon rotation by the motor. This mixing action produces a uniform suspension of the resilient bodies 38 in the cleaning solution 39 at the outlet of the mixing chamber 10.

The pump 20 is a progressing cavity pump which is commercially available from Robbins & Meyers, Inc. with principal offices at Springfield, Ohio. This pump has a rotating shaft which, between the pump inlet and outlet, is formed in a helix and the housing is internally formed with a helical cavity which is out of phase from the shaft helix. Portions of the pump cavity are sealed by portions of the helical shaft, whereby as the shaft is rotated segregated pockets or cavities are moved axially of the pump housing from the inlet to the outlet of the pump. A motor 21 is provided to appropriately rotate the pump shaft.

A hose adapter 29 is threaded onto the outlet of the pump 20 and a hose connector 30 having an external diameter corresponding to the internal diameter of the hose 22 is threaded into the adapter 29 with its axis coincident with that of the pump 20. One end of the discharge hose 22 is retained on the connector 30 by a clamp 32 and the nozzle 24 is secured to the free end of the discharge hose 22. The nozzle 24 has a cylindrical exterior shape, a diametrical recess formed across the end which recess is V-shaped in cross-section, and an elliptical opening centrally through the base of the V-shaped recess to produce a fan shaped spray.

Figure 2:
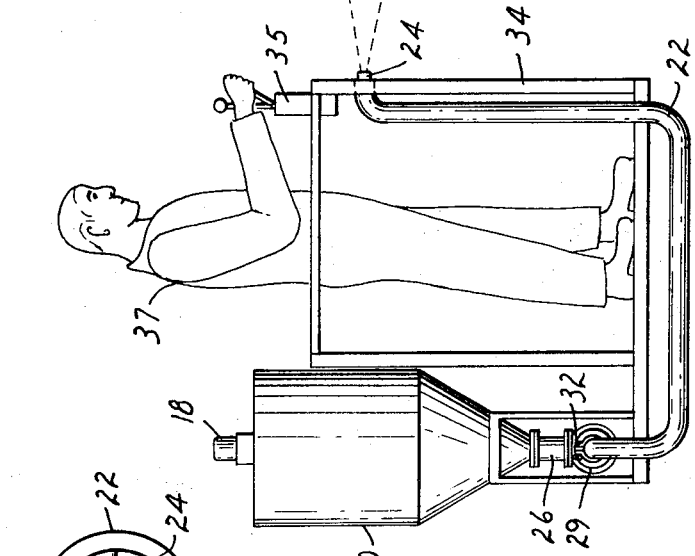
FIG. 2 is a partial longitudinal elevational view of the apparatus of FIG. 1 with parts thereof in section.
Figure 3:
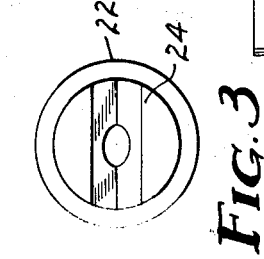
FIG. 3 is an end view of the nozzle of the apparatus of FIGS. 1 and 2.

As illustrated in FIG. 1, the apparatus of FIG. 2 is preferably mounted on a movable platform 34 which is suitably supported for example from an overhead rail or a maneuverable boom in an airplane hangar. The nozzle 24 may then be secured to the platform 34 to free the hands of an operator 37 to permit him to operate controls 35 for moving the platform 34 relative to an airplane 36. With such an arrangement, a pump of the type illustrated may be used to feed several nozzles secured to the platform 34 to increase the coverage and cleaning rate.

The apparatus of the present invention is used to practice the method of the present invention. A plurality of small, light, resilient, liquid-absorbent bodies 38 are placed in the resilient body supply 12. Suitable resilient bodies are formed of cellulose sponge or compressible urethane foam of random size with a major dimension of from about ⅛ inch to about 1 inch. The cellulose sponge is preferred because it has better cleaning characteristics.

The cleaning solution supply 14 is connected to an appropriate source of the desired cleaning solution. A suitable cleaning solution is, for example, a solution of water and a detergent based cleaner. The supply control 16 is preset to meter the resilient bodies 38 and the cleaning solution 39 into the inlet of the mixing chamber 10 in a volume ratio of cleaning solution to resilient bodies of from about 3 to 1 to about 1 to 1. This volume ratio is determined according to the dry uncompressed volume of the resilient bodies 38 in the resilient body supply 12. It has been found that the recited limiting volume ratios are preferred since below the 3 to 1 ratio cleaning effectiveness drops off rapidly while above the 1 to 1 ratio more resilient bodies are present than are required for effective cleaning and the pumping requirements increase rapidly thereby reducing the efficiency of the system.

Within the mixing chamber 10 the mixer blade moves the cleaning solution and the resilient bodies vertically downward centrally of the chamber and upward along the walls of the chamber and thereby produces a uniform suspension of the resilient bodies 38 in the cleaning solution 39 at the outlet of the mixing chamber 10.

When the valve 27 in the connecting pipe 26 is open, the pump 20 draws the uniform cleaning solution-resilient bodies suspension from the outlet of the mixing chamber 10 and maintains the uniformity of the suspension while moving the suspension through the pump 20 and the discharge hose 22 and out of the nozzle 24. The nozzle 24 is spaced from the exterior surface of the aircraft 36 to be cleaned a distance between about 1 foot and about 20 feet (0.3 to 6.0 meters) so that the surface of the aircraft 36 is not inadvertently contacted by the nozzle 24 or the platform 34 while maintaining the nozzle close enough to the surface of the aircraft to provide effective cleaning. The size of the pump 20, the size and configuration of the nozzle 24 and the speed at which the pump motor 21 drives the pump 20 are suitably chosen to impel the cleaning solution-resilient body suspension from the nozzle spaced from the aircraft between about 1 foot and about 20 feet with a controlled velocity to strike the exterior surface of the aircraft with an impact pressure of from about 0.05 p.s.i. to about 40.0 p.s.i. (0.004 to 2.81 kg. per square cm.). When used herein "impact pressure" refers to the average pressure with which the cleaning solution-resilient body suspension strikes a surface. The lower limit recited for the impact pressure has been found sufficient to effectively clean the exterior surface of an aircraft as at this pressure resilient bodies are compressed upon striking the surface and they then rebound during both of which motions the resilient bodies scrub the aircraft surface with the cleaning solution. The upper limit recited for the impact pressure is somewhat below that at which damage will be done to the aircraft surface to provide a margin of safety. In one specific example utilizing 30 percent cellulose sponge by volume an impact pressure of 0.08 p.s.i. (0.006 kg. per square cm.) may be obtained over a 44 square inch (284 square centimeters) impact area when a nozzle having a 0.07 square inch (0.45 square centimeters) outlet is spaced 30 inches from the aircraft surface, the nozzle pressure is maintained at 50 p.s.i. (3.50 kg. per square cm.) and the flow rate is maintained at 16.7 gallons per minute (63.2 liters per minute).

Thus, by using the apparatus of the present invention to practice the method of the present invention the process of cleaning aircraft may be semi-automated to rapidly and efficiently clean the exterior surface of aircraft. By providing several of the units illustrate in FIG. 1, each having a plurality of appropriately spaced nozzles 24, the downtime and, therefore, the expense involved in cleaning the exterior surface of aircraft may be markedly reduced.

Having thus described the present invention, what is claimed is:

1. A method for cleaning the exterior surface of an aircraft comprising the steps of:
   supplying a cleaning solution to the inlet of a mixing chamber having an inlet and an outlet,
   supplying small, light, resilient, liquid-absorbent bodies that are insoluble in the cleaning solution to the inlet of the mixing chamber,
   controlling said steps of supplying the cleaning solution and the resilient bodies to the mixing chamber to provide a volume ratio of cleaning solution to resilient bodies of from about 3 to 1 to about 1 to 1,
   mixing the cleaning solution and the resilient bodies in the mixing chamber to provide a uniform suspension of the resilient bodies in the solution at the outlet of the mixing chamber, and
   moving the suspension from the outlet of the mixing chamber and impelling it from a nozzle directed toward and spaced from the exterior surface of said aircraft a distance between about 1 foot and about 20 feet with a controlled velocity to strike the exterior surface of the aircraft with an impact pressure of from about 0.05 p.s.i. to about 40.0 p.s.i.

2. The method of claim 1 wherein said step of moving the suspension comprises the step of directing the suspension to the inlet of an axially progressing cavity pump and connecting a hose to the outlet of said pump, carrying the suspension through the hose under pressure toward the nozzle, and distorting the exiting suspension to a fan shape spray as it strikes the surface of the aircraft.

3. Apparatus for cleaning the exterior surface of aircraft comprising:
   a mixing chamber having an inlet and an outlet and positioned with said inlet generally vertically above said outlet,
   means for supplying a cleaning solution to said inlet of said mixing chamber,
   means for supplying small, light, resilient, liquid-absorbent bodies that are insoluble in the cleaning solution to said inlet of said mixing chamber,
   means for controlling the supply of the cleaning solution and the resilient bodies to said mixing chamber to provide a volume ratio of cleaning solution to resilient bodies of from about 3 to 1 to about 1 to 1,
   means within said mixing chamber for mixing the cleaning solution and said resilient bodies to provide a uniform suspension of the resilient bodies in the solution at said outlet of said mixing chamber, said means for mixing including a rotating member positioned within said chamber and formed to move the solution and the resilient bodies vertically downward centrally of said chamber and upward along the walls of said chamber, and
   discharge means connected to said outlet of said mixing chamber to move a said suspension out of said mixing chamber and to impel it from a nozzle spaced from the exterior surface of an aircraft a distance between about 1 foot and about 20 feet with a controlled velocity to strike the exterior surface of the aircraft with an impact pressure of from about 0.05 p.s.i. to about 40.0 p.s.i.

4. The apparatus of claim 1 wherein said discharge means includes a progressing cavity pump connected between said outlet of said mixing chamber and said nozzle to move a said suspension without disrupting the uniformity of the same.

5. The apparatus of claim 4, wherein said pump comprises a shaft with a helical portion to cooperate with a housing having a helical cavity to move the suspension axially of said shaft toward and through a hose leading to said nozzle.

* * * * *

UNITED STATES PATENT OFFICE
CERTIFICATE OF CORRECTION

Patent No.  3,716,066            Dated February 13, 1973

Inventor(s) John W. Currier, Richard T. Gadbois & Arthur G. Wilde

It is certified that error appears in the above-identified patent and that said Letters Patent are hereby corrected as shown below:

In the Claims:

Column 6, Claim 4, line 30, change "claim 1" to -- "claim 3" --.

Signed and sealed this 3rd day of July 1973.

(SEAL)
Attest:

EDWARD M. FLETCHER, JR.　　　　　　　　Rene Tegtmeyer
Attesting Officer　　　　　　　　　　　Acting Commissioner of Patents